United States Patent
Zhong et al.

(10) Patent No.: US 11,907,170 B2
(45) Date of Patent: Feb. 20, 2024

(54) SWITCHING SERIALIZATION TECHNIQUES FOR HANDLING CONCURRENT WRITE REQUESTS TO A SHARED FILE

(71) Applicant: INTERNATIONAL BUSINESS MACHINES CORPORATION, Armonk, NY (US)

(72) Inventors: Enci Zhong, Poughkeepsie, NY (US); Frank Schmuck, Campbell, CA (US); Felipe Knop, Lagrangeville, NY (US); Owen T. Anderson, Bellevue, WA (US); Huzefa Pancha, Pune (IN); Abhishek Jain, Baraut (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 271 days.

(21) Appl. No.: 17/347,493

(22) Filed: Jun. 14, 2021

(65) Prior Publication Data
US 2022/0398223 A1 Dec. 15, 2022

(51) Int. Cl.
*G06F 16/176* (2019.01)
*G06F 16/11* (2019.01)
*G06F 16/182* (2019.01)

(52) U.S. Cl.
CPC ........ *G06F 16/1767* (2019.01); *G06F 16/113* (2019.01); *G06F 16/182* (2019.01)

(58) Field of Classification Search
CPC ... G06F 16/1767; G06F 16/113; G06F 16/182
See application file for complete search history.

(56) References Cited

U.S. PATENT DOCUMENTS

| 5,940,838 | A * | 8/1999 | Schmuck | G06F 12/0862 |
| 6,826,570 | B1 * | 11/2004 | Eshel | G06F 16/1774 |
| 7,010,532 | B1 * | 3/2006 | Stakutis | G06F 16/176 |
| | | | | 707/625 |

(Continued)

OTHER PUBLICATIONS

Devulapalli, A., et al., "Distributed Queue-Based Locking Using Advanced Network Features", Proceedings of the 2005 International Conference on Parallel Processing (ICPP'05), Jun. 2005, 8 pp.

(Continued)

*Primary Examiner* — Pierre M Vital
*Assistant Examiner* — Zuheir A Mheir
(74) *Attorney, Agent, or Firm* — KONRAD RAYNES DAVDA & VICTOR LLP; David W. Victor

(57) ABSTRACT

Provided are a computer program product, system, and method for switching serialization techniques for handling concurrent write requests to a shared file. A first node serializes write requests from client nodes to write to the shared file. The first node determines whether to switch to a second node to manage write quests to the shared file based on a pattern of write requests to the shared file. The client nodes are notified to direct write requests to the shared file to the second node in response to determining to switch to the second node. The second node processes write requests to the shared file to serialize writes to the shared file after the client nodes are notified to submit the write requests to the shared file to the second node.

19 Claims, 6 Drawing Sheets

(56) References Cited

U.S. PATENT DOCUMENTS

| | | | |
|---|---|---|---|
| 8,484,258 B2 | 7/2013 | Anderson, Sr. et al. | |
| 8,930,333 B1 | 1/2015 | Prince et al. | |
| 10,257,282 B2 | 4/2019 | Lan et al. | |
| 10,262,000 B1 | 4/2019 | Bent et al. | |
| 10,382,380 B1* | 8/2019 | Suzani | H04L 47/629 |
| 10,659,554 B2 | 5/2020 | Ananthanarayanan et al. | |
| 2002/0035665 A1* | 3/2002 | Basham | G06F 12/00 |
| | | | 711/111 |
| 2012/0066191 A1* | 3/2012 | Chang | G06F 16/1774 |
| | | | 707/827 |
| 2018/0173451 A1* | 6/2018 | Uttamchandani | G06F 9/5083 |
| 2021/0056074 A1* | 2/2021 | Zhu | G06F 16/178 |
| 2021/0182130 A1* | 6/2021 | Sridharan | G06F 16/1844 |

OTHER PUBLICATIONS

Liu, H., et al., "CFS: a Distributed File System for Large Sale Container Platforms", Proceedings of the 2019 International Conference on Management of Data, Jun. 2019, 13 pp.

Haustein, N., "IBM Spectrum Scale Immutability Introduction, Configuration Guidance, and Use Cases", IBM Redbooks, Apr. 17, 2020, 40 pp.

Unix & Linux Stack Exchange, "Multiple Appenders Writing to the Same File on NFS Share", [online], [Retrieved on May 20, 2021], Retrieved from the Internet at <URL: https://unix.stackexchange.com/questions/299627/multiple-appenders-wr . . . >, 4 pp.

\* cited by examiner

SWITCHING SERIALIZATION TECHNIQUES FOR HANDLING CONCURRENT WRITE REQUESTS TO A SHARED FILE

BACKGROUND OF THE INVENTION

1. Field of the Invention

The present invention relates to a computer program product, system, and method for switching serialization techniques for handling concurrent write requests to a shared file.

2. Description of the Related Art

In a clustered file system environment, a token manager may manage a lock or token to a shared file accessed by multiple client nodes to synchronize updates to the shared file to preserve file system consistency. In parallel computing applications, a group of distributed processes perform concurrent operations on the same shared file. With a centralized token manager, a client node will have to acquire necessary tokens from the token manager to access a file. The client node granted the token for a file is allowed to perform accesses associated with the token without having to further request permission until another node attempts a file system operation on the same file and revokes the token acquired by the client node currently holding the token. Similarly, for a write append operation to write data at an end of the file, the client node must acquire a token from the token manager for a write append to the shared file.

For a write append operation, a client node needs to obtain an exclusive token from the token manager. If the token manager is holding the token for the file to write append, then the token manager will grant the token to the requesting client node to hold to perform write append operations. If another client node is currently holding the token for the write append to the file, then the token manager informs the requesting client node of the current client node holding the token. The requesting client node will revoke/steal the token from the client node currently holding the token. Once the requesting client node receives the token for the write append to the file, either directly from the token manger or by revoking the token at another client node, the requesting client node will append the data to the shared file.

There is a need in the art for improved techniques to serialize exclusive access requests to a shared file by client nodes in a distributed computing environment.

SUMMARY

Provided are a computer program product, system, and method for switching serialization techniques for handling concurrent write requests to a shared file. A first node serializes write requests from client nodes to write to the shared file. The first node determines whether to switch to a second node to manage write quests to the shared file based on a pattern of write requests to the shared file. The client nodes are notified to direct write requests to the shared file to the second node in response to determining to switch to the second node. The second node processes write requests to the shared file to serialize writes to the shared file after the client nodes are notified to submit the write requests to the shared file to the second node.

DETAILED DESCRIPTION

Multiple client nodes needing to access a token manager to obtain a token for a write append request to a shared file will experience latency waiting to obtain the token from the token manager or revoke and take the token from another client node currently holding the token. This latency to wait to obtain the token for the write append operation results in a performance bottleneck for the requesting client node. Each client node requesting a write append requires a unique position in the file at which to write the write append data, where the offset location or position in the file depends on the size of all prior appends. Total ordering of file append operations must be determined and this serialization requirement is introduced to maintain consistency. Requiring client nodes to serialize their write appends through the token manager significantly reduces client node performance.

Described embodiments provide improvements to computer technology for managing concurrent write append requests from multiple client nodes to a shared file by removing the token congestion. To avoid token congestion, described embodiments notify client nodes to redirect append write requests to a shared file from a first node, or token manager node, to a second node, or append manager node. The notification to switch to using the second node is performed when the pattern of accesses to the shared file exceed a threshold, such as based on frequency and/or number of accesses to the shared file. The write append manager carries out the append operation on behalf of all client nodes by buffering received write append data and then flushing to the shared file.

Figure 1:
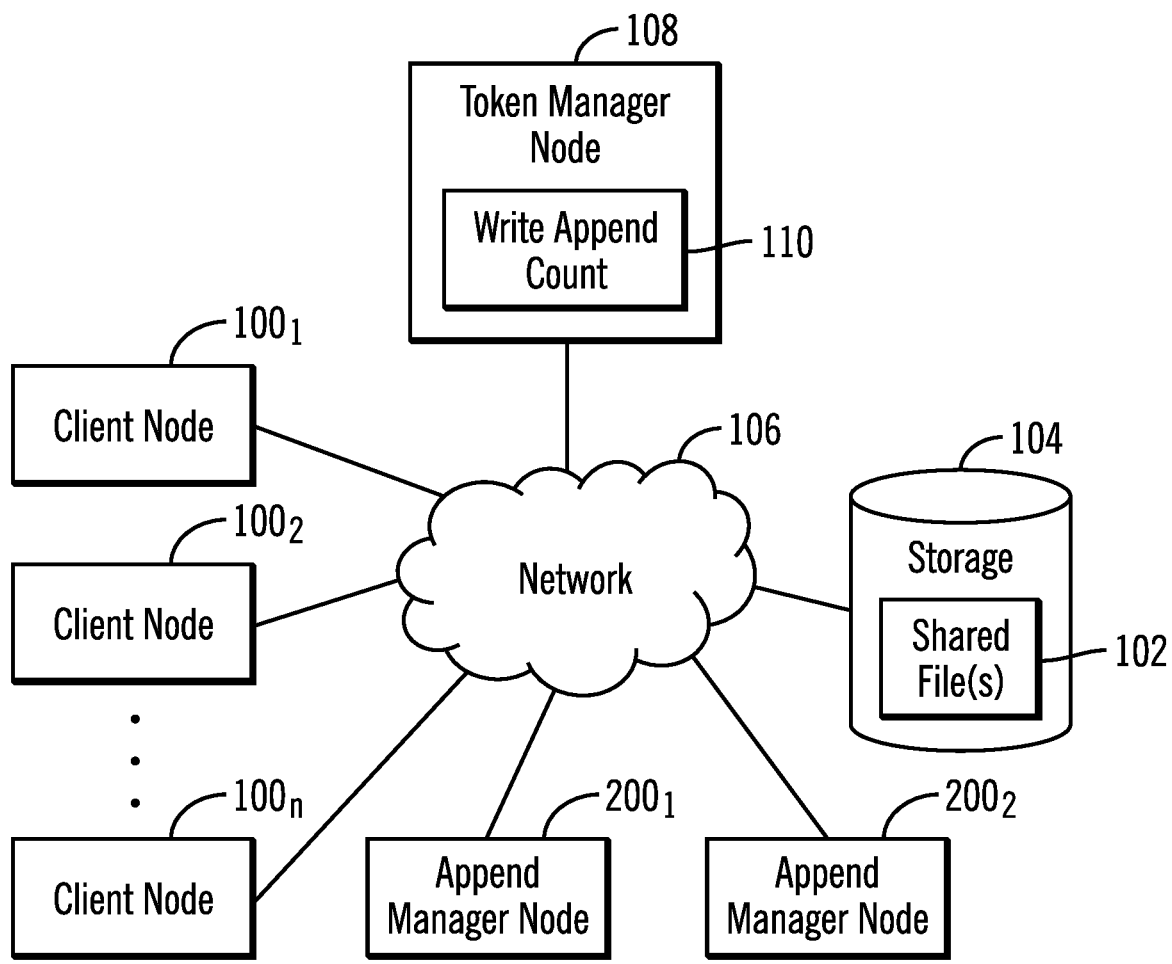
FIG. 1 illustrates an embodiment of a distributed computing environment.

FIG. 1 illustrates an embodiment of a cluster of distributed computing nodes including client nodes $100_1$, $100_2$ . . . $100_n$ that seek to access one or more shared files 102 in a storage 104 over a network 106. Client nodes $100_1$, $100_2$ . . . $100_n$ seeking exclusive access to a shared file 102 may have to direct requests toward a token manager node 108 to obtain an exclusive access token that must be held to perform an exclusive access request to the shared file, such as write data, append data, etc. The token manager node 108 maintains a write append count 110 for each shared file 102 to use to determine when to notify the client nodes $100_1$, $100_2$ . . .

$100_n$ to switch to using a designated append manager node $200_1$, $200_2$ to manage append write access to the shared file 102. If a designated append manager node $200_1$ fails, then another append manager node $200_2$ may take-over managing write append requests to the shared file 102.

In certain embodiments, the client nodes $100_1$, $100_2$ ... $100_n$ may execute artificial intelligence workloads that seek to concurrently append data to the shared file 102 comprising an immutable master data set.

The shared file 102 may comprise a data set, object, database, and other data structure of data.

Figure 2:
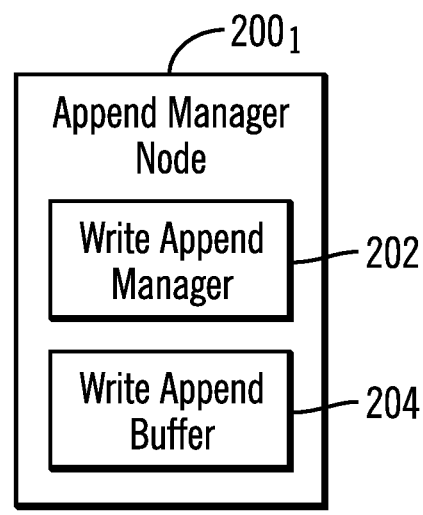
FIG. 2 illustrates an embodiment of an append manager node to serialize write append access to a shared file.

FIG. 2 illustrates an embodiment of components in an append manager node $200_i$, such as nodes $200_1$, $200_2$, including a write append manager 202 to manage write append requests directed to a shared file 102 and a write append buffer 204 to buffer write append data from a plurality of write append requests. Write data in the write append buffer 204 are flushed to the shared file 102 in a memory of the node $200_i$ or the storage 104.

Generally, program modules, such as the program components in the client nodes $100_1$, $100_2$ ... $100_n$, append manager nodes $200_1$, $200_2$, and token manager node 108, including the write append manager 202, may comprise routines, programs, objects, components, logic, data structures, and so on that perform particular tasks or implement particular abstract data types. The program components of FIGS. 1 and 2 may be implemented in one or more computer systems, where if they are implemented in multiple computer systems, then the computer systems may communicate over a network.

Any node in the system may function s an append manager node $200_i$.

The network 106 may comprise a Storage Area Network (SAN), Local Area Network (LAN), Intranet, the Internet, Wide Area Network (WAN), peer-to-peer network, wireless network, arbitrated loop network, etc. The network 106 may be implemented as a single network or more than two networks.

The nodes of FIGS. 1 and 2 may be implemented in a cluster or cloud computing environment.

Figure 3:
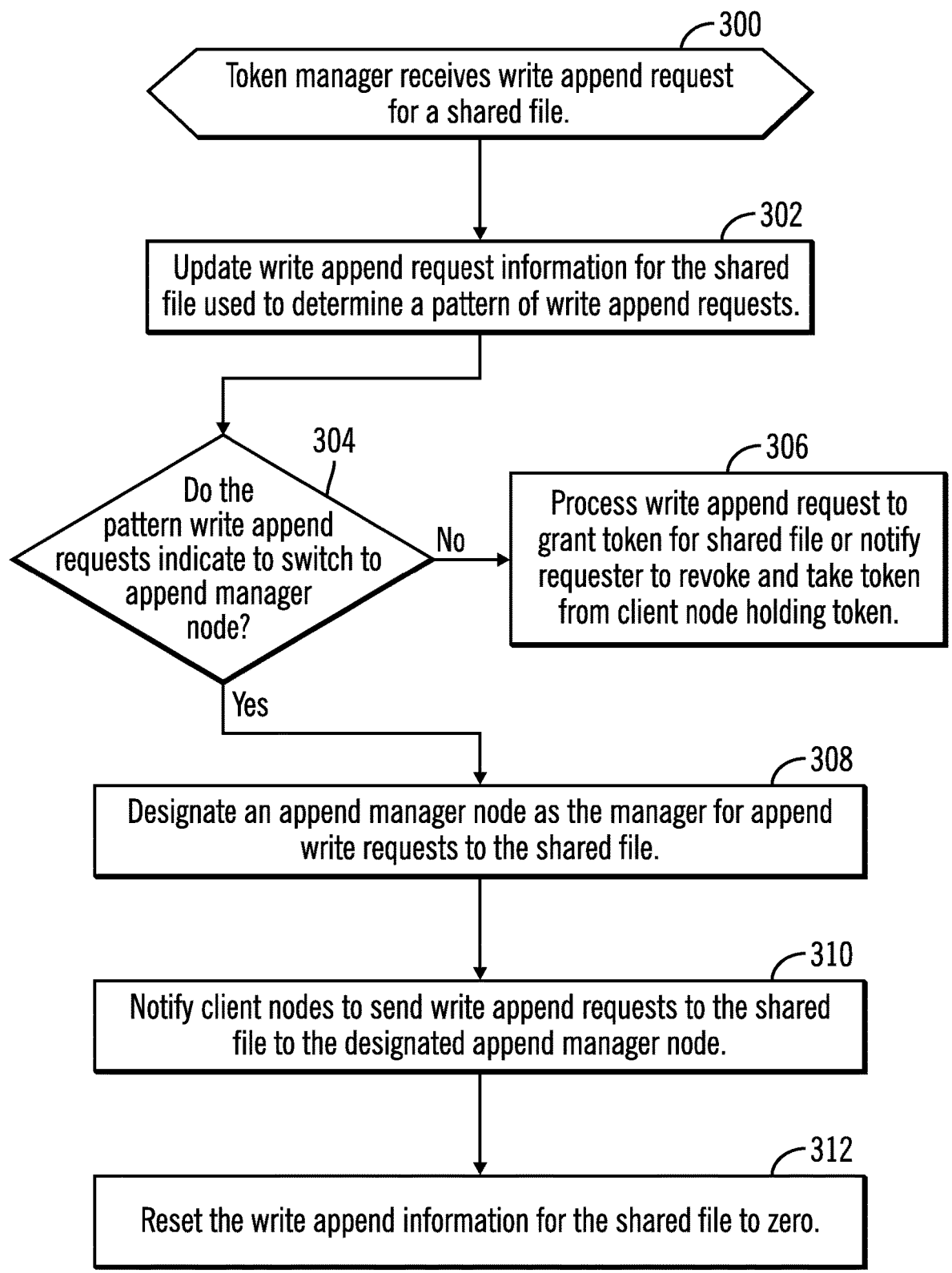
FIG. 3 illustrates an embodiment of operations for a token manager to process write append requests to a shared file.

FIG. 3 illustrates an embodiment of operations performed by the token manager 108 to manage token requests from the client nodes $100_1$, $100_2$ ... $100_n$ to a shared file 102. Upon receiving (at block 300) a write append request for the shared file 102 from a client node $100_1$, the token manager 108 update (at block 302) write append request information, such as a write append count 110 and/or frequency of accesses, which information is used to determine a pattern of write append requests. If (at block 304) a pattern of write append requests, such as indicated in the write append request information, e.g., write append count 110, indicate to not switch to the append manager node $200_1$, then the token manager 108 processes (at block 306) the write append request to grant the exclusive access token for the shared file 102 if the token manager 108 has the token or notify the client node $100_i$ requestor to revoke and take the token from the client node $100_j$ currently holding the token. If (at block 304) the pattern of write append requests indicate to switch the append manager node $200_1$, then the token manager 108 designates (at block 308) an append manager node $200_1$ as the manager for append write requests to the shared file 102.

In certain embodiments, the token manager 108 may consider a number of write append requests and/or frequency of write append requests in a monitored time period to determine the pattern of write append requests and determine when the pattern indicates to switch to an append manager node $200_1$. In alternative embodiments, the token manager 108 may use other techniques at block 304 to determine when to switch to the append manager node $200_1$ to handle write append requests, such as heuristics based on some combination of the number of write append requests and the frequency of requests, e.g., such as a threshold number of requests are arriving within a threshold time.

The token manager 108 notifies (at block 310) the client nodes $100_1$, $100_2$ ... $100_n$ to send write append requests to the shared file 102 to the designated append manager node $200_1$. After switching to using the append manager node $200_i$, the write append information for the shared file 102, such as write append count 110, may be reset (at block 312) to restart the gathering of write append information used to determine when to switch to using a designated n append manager node $200_i$ for the shared file 102.

With the embodiment of FIG. 3, the token manager 108 will switch to using the append manager node $200_1$ to handle write append requests to the specific shared file 102 having a high level of append write requests. In this way, certain shared files 102 may be managed through the token manager 108 and other shared files 102 may be managed through an append manager node $200_i$. Further, the append manager node $200_i$ may provide a less computationally expensive algorithm for managing concurrent write append requests, such as by writing write append data to the write append buffer 204 and then flush the buffered data to the shared file 102 to serialize access. Using the write append buffer 204 may optimize write append access to the shared file 102 over the token manager 108 algorithm that requires a requestor client node $100_i$ to be granted the token for the shared file or revoke/take the token from another client node $100_j$.

The token manager 108 may maintain information associating different shared files 102 with an append manager node $200_i$ designated to handle write append requests to the shared file. The token manager 108 may use workload balancing to select different append manager nodes $200_i$ to handle write append requests for different files.

Figure 4:
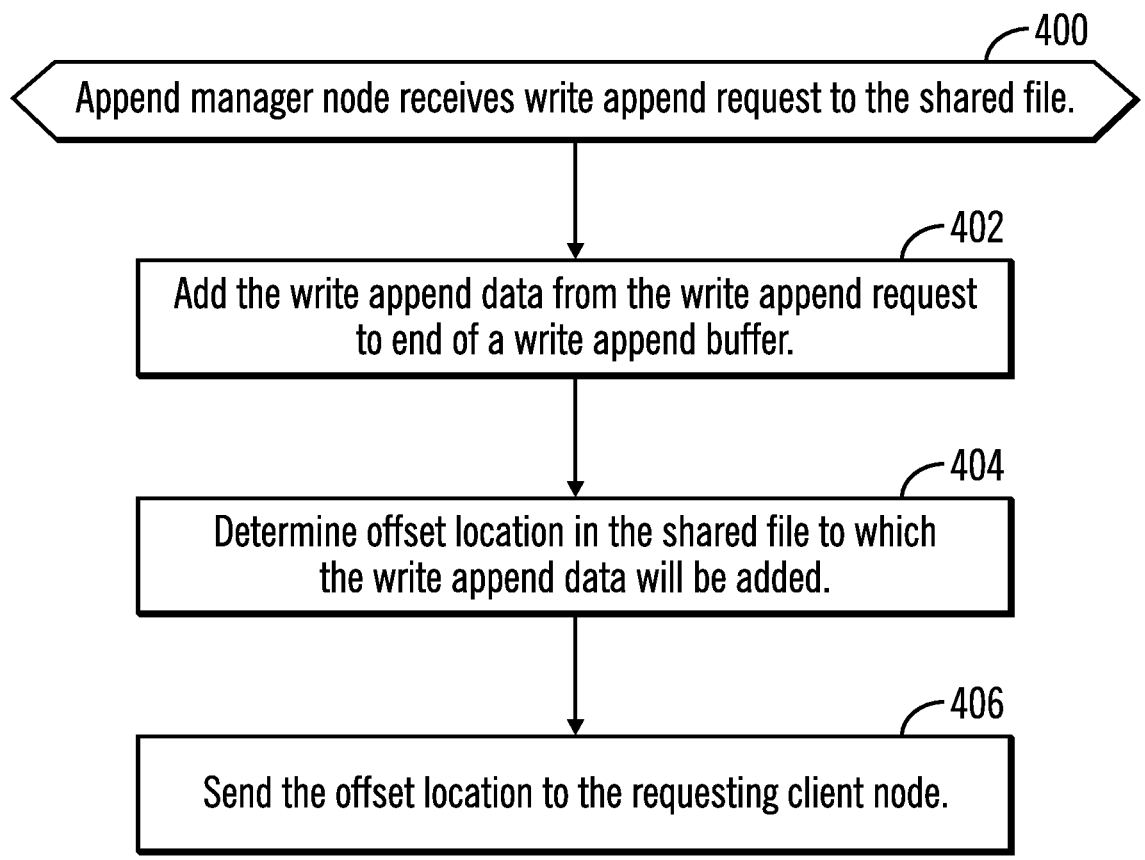
FIG. 4 illustrates an embodiment of operations for an append manager node to process write append requests to the shared file.

FIG. 4 illustrates an embodiment of operations performed by the write append manager 202 in the append manager node $200_i$ currently designated for a shared file 102 to process a write append request to the shared file 102. Upon receiving (at block 400) the write append request to the shared file 102, the write append manager 202 adds (at block 402) the append write data to the end of the write append buffer 204. A determination is made (at block 404) of an offset location in the shared file 102 to which the write append data will be added. The write append manager 202 sends (at block 406) the offset location to the requesting client node $100_i$ to indicate the write append request is currently being processed.

Figure 5:
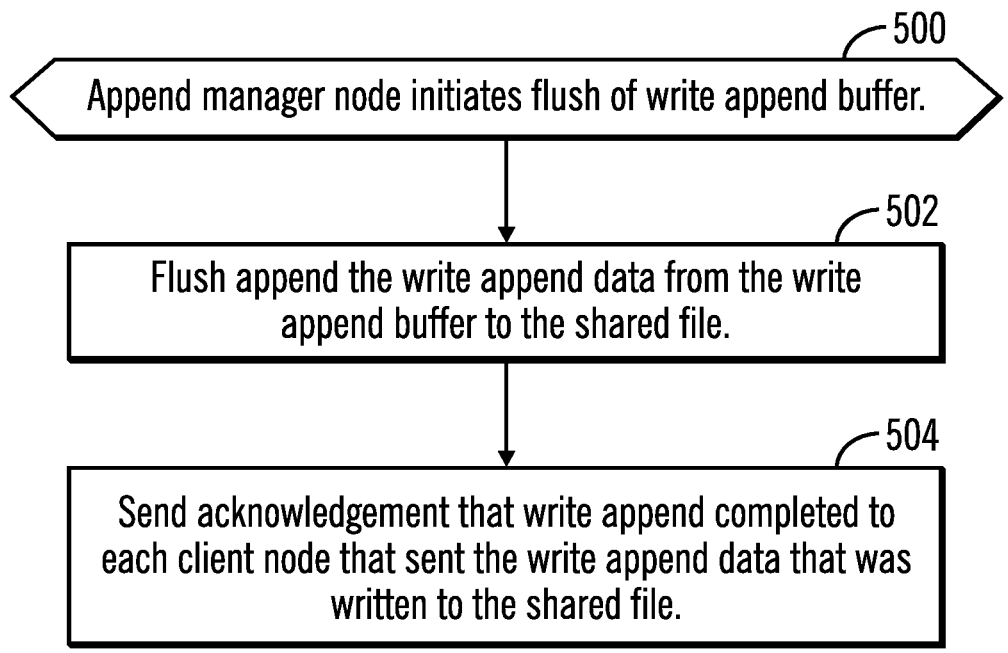
FIG. 5 illustrates an embodiment of operations for the append manager node to flush buffered write append requests to the shared file.

FIG. 5 illustrates an embodiment of operations performed by the write append manager 202 to flush write append data from the write append buffer 204 to the shared file 102, which may be initiated when the write append buffer 204 reaches a full threshold or periodically. Upon initiating (at block 500) a flush operation, the write append manager 202 flushes (at block 502) the write append data in the write append buffer 204 to append to the shared file 102 in the order in which the data is buffered in the write append buffer 204. Acknowledgement of write append complete is sent (at block 504) to each client node $100_i$ that sent the write append data written/flushed to the shared file 102.

With the operations of FIGS. 4 and 5, a separate append manager node $200_i$ handles a high load of write append requests to a shared file 102 using an efficient algorithm that allows the write append data to be immediately buffered and eventually flushed and appended to the shared file 102 in a manner that reduces latency and a performance bottleneck from the more computationally expensive token management operations of the token manager 108 for workloads having a large number of concurrent write append requests directed to a single shared file 102.

Figure 6:
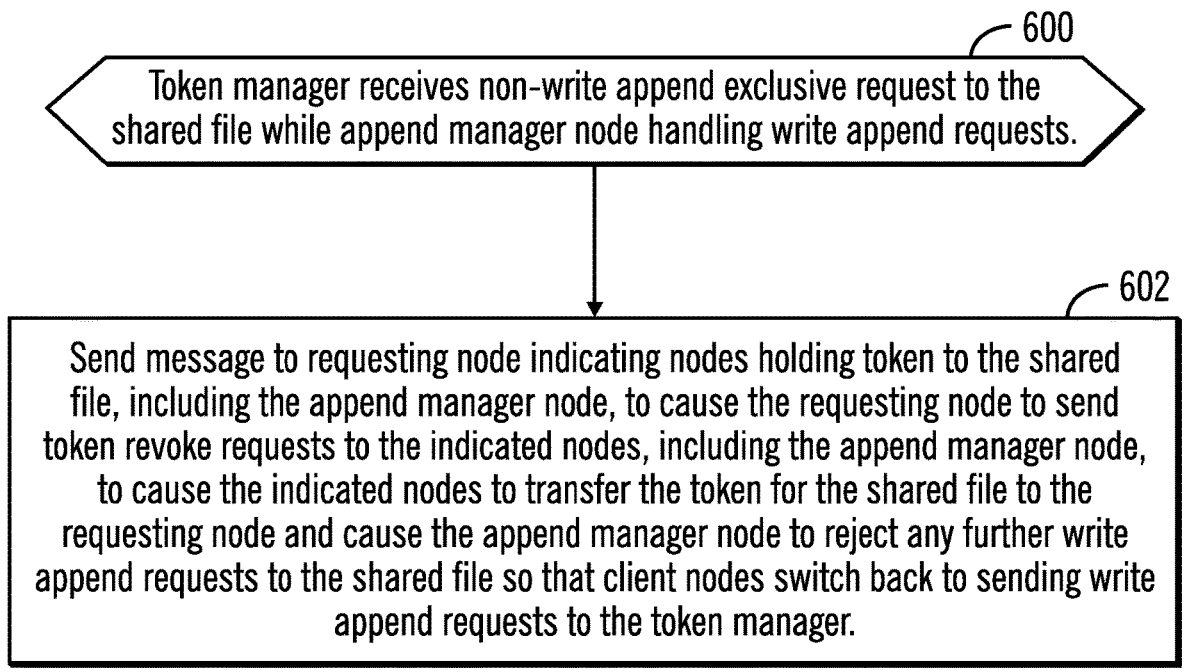
FIG. 6 illustrates an embodiment of operations for the token manager to revoke the append manager node handling of write append requests in response to a non-write append exclusive access request for the shared file.

FIG. 6 illustrates an embodiment of operations performed by the token manager 108 when receiving a request from client nodes $100_1, 100_2 \ldots 100_n$ for exclusive access to the shared file 102 other than for write append access, such as a non-append type write. Upon receiving (at block 600) a non-write append type write when exclusive access to the shared file 102 is handled by an append manager node $200_i$, the token manager 108 sends (at block 602) a message to the requesting client node $100_i$ indicating nodes holding the token to the shared file, including the append manager node $200_i$. This message causes the requesting client node $100_i$ to send token revoke requests to the indicated nodes, including the append manager node $200_i$, to cause the indicated nodes to transfer the token for the shared file to the requesting client node $100_i$. The append manager node $200_i$ upon receiving the token revoke request will cease managing write append access to the shared file 102 and reject any further write append requests to the shared file. As a result, the client nodes $100_1, 100_2 \ldots 100_n$ switch back to sending write append requests to the shared file 102 to the token manager 108.

With the operations of FIG. 6, a non-append exclusive access to a shared file 102 will revoke the append manager node $200_i$ from managing write append access to the shared file 102 and return write append access management to the token manager 108 to handle exclusive access for all types of write and exclusive access requests. Once the token manager 108 returns to managing exclusive access to the shared file 102, the token manager 108 will begin incrementing the write append count 110 for the shared file 102 according to the operations of FIG. 3 until the threshold is again reached and an append manager node $200_i$ is again designated to handle write append access.

Figure 7:
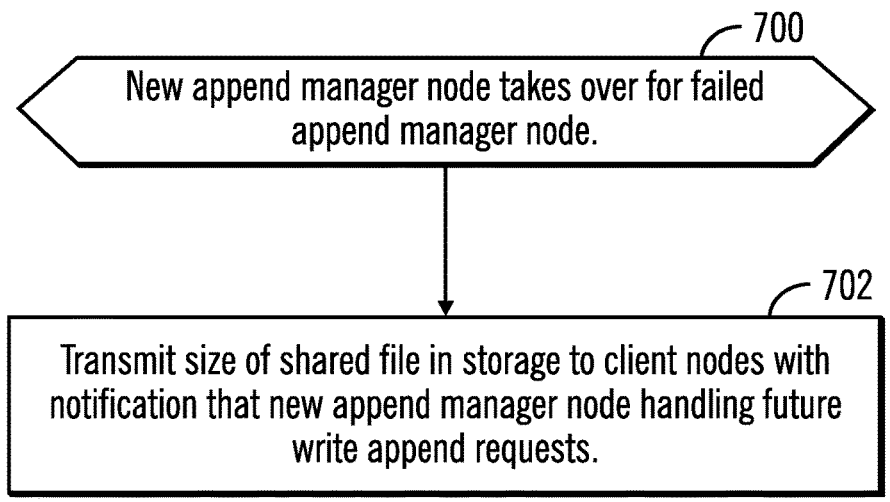
FIG. 7 illustrates an embodiment of operations for a new append manager node to take over managing write append requests to the shared file if the current append manager node fails.

FIG. 7 illustrates an embodiment of operations performed by a new append manager node $200_2$ taking over write append access to the shared file 102 after a currently designated append manager node $200_1$ handling write append access fails. Upon the new append manager node $200_2$ taking over (at block 700) write append access for a failed append manager node $200_1$, the new append manager node $200_2$ transmits (at block 702) a size of the shared file 102 in storage to client nodes $100_1, 100_2 \ldots 100_n$ with notification of the new append manager node $200_2$ handling future write append requests.

Figure 8:
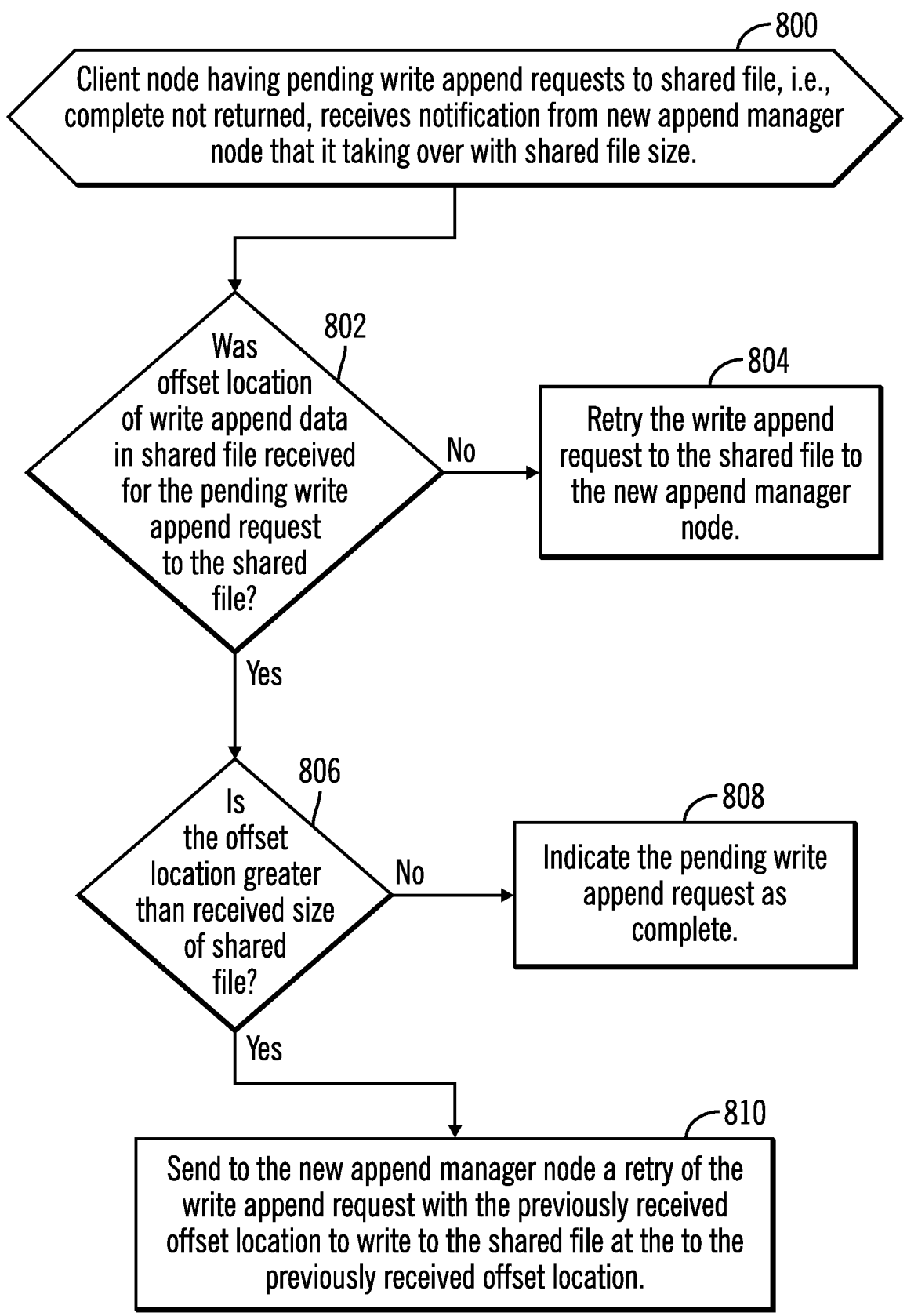
FIG. 8 illustrates an embodiment of operations for a client node to process a message from the new append manager node taking over handling of write append requests for the shared file.

With the embodiment of FIG. 7, the new append manager node $200_2$ notifies client nodes $100_1, 100_2 \ldots 100_n$ having pending write append requests to the shared file with the failed append manager node $200_1$ of the new append manager node $200_2$ now handling write append requests and information the receiving client nodes $100_1, 100_2 \ldots 100_n$ can use to determine whether to retry the pending write append request according to the operations of FIG. 8.

FIG. 8 illustrates an embodiment of operations performed by a client node $100_i$ upon receiving notification of the new append manager node $200_2$ taking over write append access management of the shared file 102 with the shared file 102 size. Upon receiving (at block 800) the notification (sent at block 702 in FIG. 7), if (at block 802) the offset location of write append data in the shared file 102 was not received for the pending write append request to the shared file 102 (at block 406 in FIG. 4), then the client node $100_i$ retries (at block 804) the write append request to the shared file to the new append manager node $200_2$. If (at block 802) the offset location was received (at block 406 in FIG. 4) from the failed append manager node $200_1$, then the client node $100_i$ determines (at block 806) whether the previously received offset location is greater than the received size of the shared file 102, which indicates that the data was not written to the offset location because the shared file 102 size is too small. If (at block 806) the offset location is less than the shared file size, which means the write append data from the client node $100_i$ was flushed to the shared file 102 but acknowledgment not received, then the client node $100_i$ indicates (at block 808) the write append request as complete. If (at block 806) the offset location is greater than the shared file size, which means the write append data from the client node $100_i$ was not flushed to the shared file 102, then the client node $100_i$ sends (at block 810) to the new append manager node $200_2$ a retry of the write append request with the previously received offset location to write to the shared file 102 at the to the previously received offset location.

With the embodiment of FIG. 8, the client node $100_i$ upon receiving notification of the switch to a new append manager node $200_2$ may then use the provided information to determine whether it needs to resend the write append request or whether the failed append manager node $200_1$ was able to flush the write append data before failing.

Described embodiments discuss switching to the append manager node to handle write append requests. In alternative embodiments, the switching to a manager node to buffer write requests to flush to the shared file 102 may be performed with respect to write requests other than write append requests.

The reference characters used herein, such as i, j, and, n are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIGS. 1 and 2, including the client nodes $100_1$, $100_2$ ... $100_n$, token manager node 108, and append manager nodes $200_1$, $200_2$, $200_n$, may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

Figure 9:
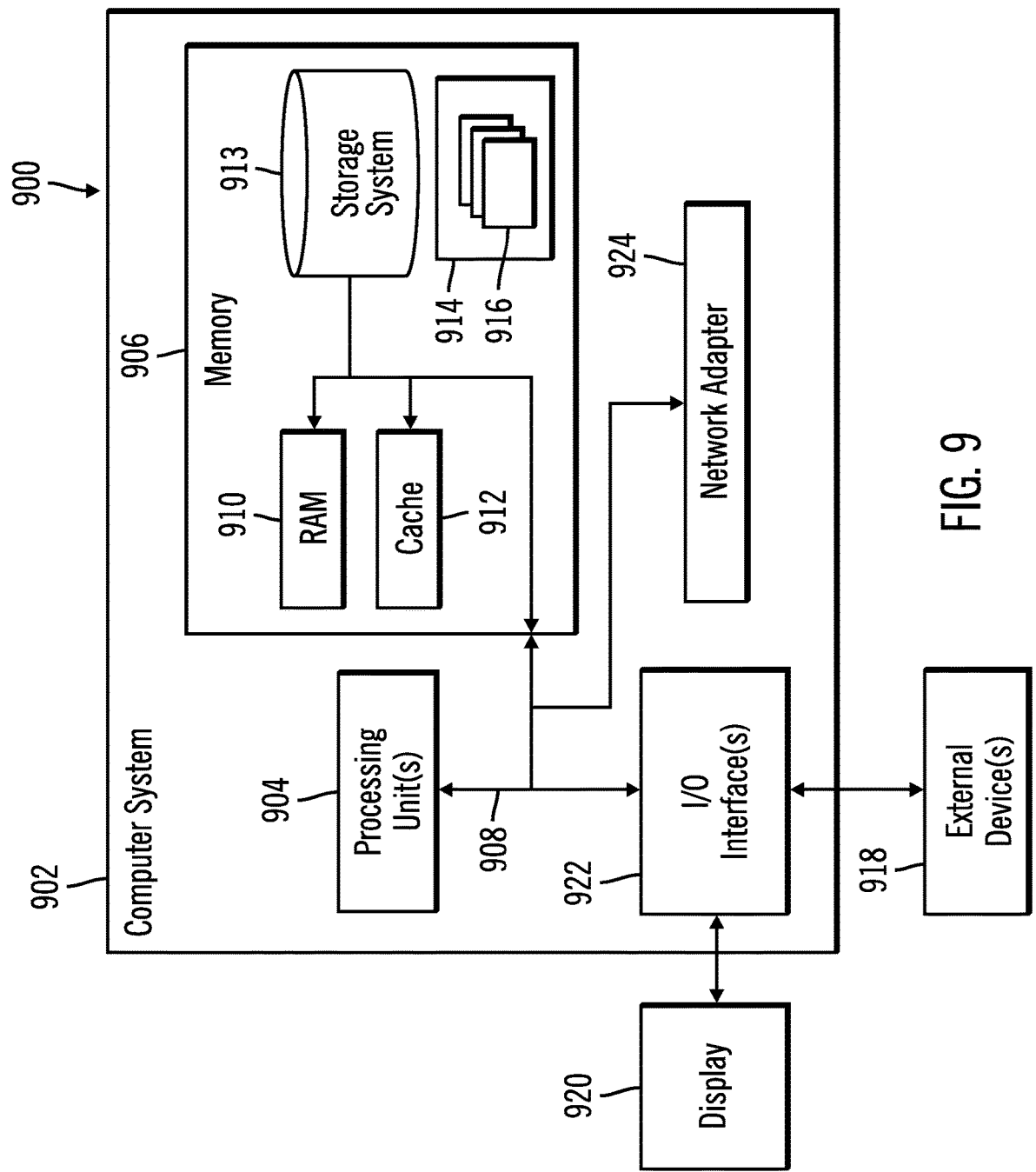
FIG. 9 depicts a computing environment in which the components of FIG. 1 may be implemented.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to, microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing access to a shared file in a storage from client nodes in a network, wherein the computer program product comprises a computer readable storage medium having computer readable program instructions to cause a first node and a second node to perform operations, the operations comprising:
   serializing, by the first node, write requests from client nodes to write to the shared file using a first serialization technique involving use of providing an exclusive token to the client nodes to write to the shared file;
   determining, by the first node, whether to switch to the second node to manage write requests to the shared file based on a pattern of write requests to the shared file;
   notifying the client nodes to direct write requests to the shared file to the second node in response to determining to switch to the second node; and
   processing, by the second node, write requests to the shared file to serialize writes to the shared file, using a second serialization technique different from the first serialization technique to serialize writes to the shared file, after the client nodes are notified to submit the write requests to the shared file to the second node.

2. The computer program product of claim 1, wherein the exclusive token can only be held by one client node, and wherein the second serialization technique involves the second node buffering received writes in a buffer and periodically flushing the buffer of writes to the shared file.

3. The computer program product of claim 1, wherein the determining whether to switch to the second node based on the pattern of write requests to the shared file comprises:
    determining a number and frequency of write requests to the shared file, wherein the determining to switch to the second node is made in response to the number and the frequency of the write requests exceeding a threshold.

4. The computer program product of claim 1, wherein the write requests to the shared file are to write append data to the shared file.

5. The computer program product of claim 4, wherein the notifying the client nodes to direct the write requests to the shared file to the second node only applies to write append requests to the shared file, wherein the operations further comprise:
    receiving, at the first node, a non-append write request to the shared file after notifying the client nodes to direct write append requests to the second node; and
    sending a revoke notification to the client nodes and the second node to switch back to directing append write requests to the first node in response to receiving the non-append write request to the shared file.

6. The computer program product of claim 4, wherein the computer readable program instructions further cause a third node to perform operations, the operations comprising:
    in response to a failure at the second node, notifying, by the third node, client nodes, having submitted write append requests to the shared file, indication to direct requests to the shared file to the third node; and
    receiving, at the third node, resubmissions of write append requests from client nodes that submitted the write append requests and did not receive acknowledgments from the second node that the append write requests completed.

7. The computer program product of claim 4, wherein the operations further comprise:
    in response to receiving an append write request to the shared file from a requesting client node, notifying, by the second node, the requesting client node of an offset location in the shared file to which the append write data will be written; and
    sending an acknowledgment to the requesting client node that the append write request completed in response to flushing append write data of the append write request to the offset location in the shared file.

8. The computer program product of claim 7, wherein the computer readable program instructions further cause a third node to perform operations, the operations comprising:
    in response to a failure at the second node, notifying, by the third node, client nodes having submitted write append requests to the shared file to direct requests to the shared file to the third node and a size of the shared file;
    receiving a resubmission of the write append request from a client node, having received the notification from the third node, with the offset location sent to the client node from the second node in response to the client node determining that the offset location is greater than the size of the shared file; and
    writing, by the third node, write append data for the write append request to the offset location included in the resubmission.

9. The computer program product of claim 8, wherein the notifying the client nodes to direct requests to the third node causes one of the client nodes receiving the notification to retry a previously sent write append request as a new write append request in response to not having received the offset location from the second node for the previously sent write append request.

10. A system for managing access to a shared file in a storage from client nodes in a network, comprising:
    a first node in communication with the client nodes;
    a second node in communication with the client nodes,
    wherein the first node performs operations, the operations comprising:
        serializing write requests from client nodes to write to the shared file using a first serialization technique involving use of providing an exclusive token to the client nodes to write to the shared file;
        determining whether to switch to the second node to manage write requests to the shared file based on a pattern of write requests to the shared file;
        notifying the client nodes to direct write requests to the shared file to the second node in response to determining to switch to the second node; and
    wherein the second node performs processing write requests to the shared file to serialize writes to the shared file, using a second serialization technique different from the first serialization technique to serialize writes to the shared file, after the client nodes are notified to submit the write requests to the shared file to the second node.

11. The system of claim 10, wherein the second node buffers received writes in a buffer and periodically flushing the buffer of writes to the shared file.

12. The system of claim 10, wherein the write requests to the shared file are to write append data to the shared file, further comprising:
    a third node in communication with the client nodes, wherein the third node performs operations, the operations comprising:
        in response to a failure at the second node, notifying client nodes, having submitted write append requests to the shared file, indication to direct requests to the shared file to the third node; and
        receiving resubmissions of write append requests from client nodes that submitted the write append requests and did not receive acknowledgments from the second node that the append write requests completed.

13. The system of claim 10, wherein the write requests to the shared file are to write append data to the shared file, wherein the second node further performs operations:
    in response to receiving an append write request to the shared file from a requesting client node, notifying the requesting client node of an offset location in the shared file to which the append write data will be written; and
    sending an acknowledgment to the requesting client node that the append write request completed in response to flushing append write data of the append write request to the offset location in the shared file.

14. The system of claim 13, further comprising:
    a third node, wherein the third node performs operations comprising:
        in response to a failure at the second node, notifying client nodes having submitted write append requests to the shared file to direct requests to the shared file to the third node and a size of the shared file;

receiving a resubmission of the write append request from a client node, having received the notification from the third node, with the offset location sent to the client node from the second node in response to the client node determining that the offset location is greater than the size of the shared file; and writing write append data for the write append request to the offset location included in the resubmission.

15. A method for managing access to a shared file in a storage from client nodes in a network, comprising:

serializing, by a first node, write requests from client nodes to write to the shared file using a first serialization technique involving use of providing an exclusive token to the client nodes to write to the shared file;

determining, by the first node, whether to switch to a second node to manage write requests to the shared file based on a pattern of write requests to the shared file;

notifying the client nodes to direct write requests to the shared file to the second node in response to determining to switch to the second node; and processing, by the second node, write requests to the shared file to serialize writes to the shared file, using a second serialization technique different from the first serialization technique to serialize writes to the shared file, after the client nodes are notified to submit the write requests to the shared file to the second node.

16. The method of claim 15, wherein the second node buffers received writes in a buffer and periodically flushing the buffer of writes to the shared file.

17. The method of claim 15, wherein the write requests to the shared file are to write append data to the shared file, further comprising:

in response to a failure at the second node, notifying, by a third node, client nodes, having submitted write append requests to the shared file, indication to direct requests to the shared file to the third node; and receiving, at the third node, resubmissions of write append requests from client nodes that submitted the write append requests and did not receive acknowledgments from the second node that the append write requests completed.

18. The method of claim 15, wherein the write requests to the shared file are to write append data to the shared file, further comprising:

in response to receiving an append write request to the shared file from a requesting client node, notifying, by the second node, the requesting client node of an offset location in the shared file to which the append write data will be written; and sending an acknowledgment to the requesting client node that the append write request completed in response to flushing append write data of the append write request to the offset location in the shared file.

19. The method of claim 18, further comprising:

in response to a failure at the second node, notifying, by a third node, client nodes having submitted write append requests to the shared file to direct requests to the shared file to the third node and a size of the shared file;

receiving a resubmission of the write append request from a client node, having received the notification from the third node, with the offset location sent to the client node from the second node in response to the client node determining that the offset location is greater than the size of the shared file; and writing, by the third node, write append data for the write append request to the offset location included in the resubmission.

* * * * *